United States Patent [19]
Zampini et al.

[11] Patent Number: 5,444,789
[45] Date of Patent: Aug. 22, 1995

[54] MONITOR SELECT INDICATOR FOR AN AUDIO FOLLOW VIDEO MIXER

[75] Inventors: Michael A. Zampini; Alan Flum, both of Boca Raton, Fla.

[73] Assignee: Sony Electronics Inc., Park Ridge, N.J.

[21] Appl. No.: 76,761

[22] Filed: Jun. 15, 1993

[51] Int. Cl.⁶ .................................................. H04B 1/00
[52] U.S. Cl. .................................................. 381/119
[58] Field of Search ..................................... 381/119

[56] References Cited

U.S. PATENT DOCUMENTS 5,060,272 10/1991 Suzuki .................................. 381/119
5,233,666 8/1993 Deveau ................................ 381/119
5,257,317 10/1993 Stavrou ............................... 381/119

OTHER PUBLICATIONS

Soundcraft Brochure Describing USA 24II Serial Interface (not dated).

Primary Examiner—Forester W. Isen
Attorney, Agent, or Firm—Ronald P. Kananen

[57] ABSTRACT

An audio follow video mixer is disclosed which has a display that provides a plurality of monitor indicator LEDs corresponding to a selected audio channel. These LEDs visually indicate which channels are currently being monitored, including playback channels and line out channels. This invention permits an operator to determine which channel is being monitored during a preview operation.

8 Claims, 3 Drawing Sheets

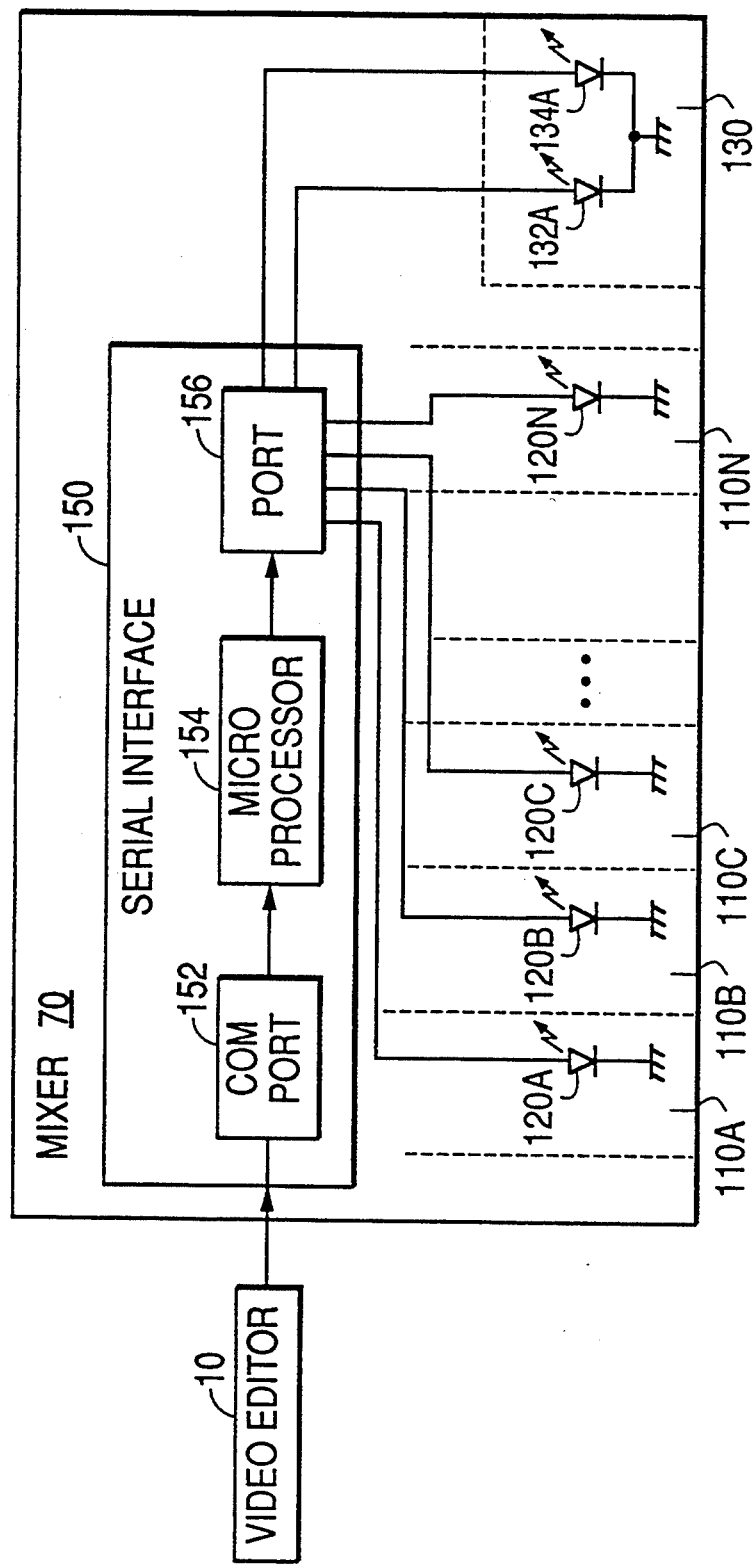

MONITOR SELECT INDICATOR FOR AN AUDIO FOLLOW VIDEO MIXER

CROSS REFERENCE TO RELATED APPLICATIONS

Reference is made to commonly owned-co-pending applications entitled "CROSS FADE INDICATORS," Ser. No. 07/866,356 filed on Apr. 10, 1992, "MICROPROCESSOR CONTROLLED MULTIPLE CHANNEL VTR CONFIGURATION OF AN AUDIO FOLLOW VIDEO MIXER," Ser. No. 08/045,605 filed on Apr. 9, 1993, and "EDIT SELECT SWITCH FOR MONITOR SOURCE SELECT", Ser. No. 08/040,594 filed on Mar. 21, 1993, the disclosures of which are hereby incorporated by reference.

FIELD OF THE INVENTION

This invention relates to audio monitoring during the mixing of a plurality of audio channels using an audio follow video mixer, and more specifically to indicators for indicating which channels are being monitored during an editing operation.

BACKGROUND OF THE INVENTION

In the use of audio follow video mixers, it is common to mix signals from various channels. Mixing is commonly performed by use of a mixer unit which may be operated automatically or manually. In order to facilitate such applications of an audio follow video mixer, it is useful to monitor the various audio signals being mixed and recorded. More specifically, it is desirable to preview an edit by audio monitoring of the crossfade between selected audio channels in the mixer. A detailed example of a configuration by which a preview function may be implemented is described in commonly assigned co-pending application Ser. No. 08/045,605, referred to above.

Monitoring is typically achieved by providing line out audio signals corresponding to crossfading signals to one or more output terminals which supply the signals to monitoring devices. However, many audio follow videio mixers are quite complicated, often being used to process several different channels. Thus, when performing edits using a typical audio follow video mixer, it becomes difficult for an operator to determine which audio channels are being monitored at any given time. In particular, it becomes difficult for an operator to keep track of which channels are being monitored while the mixer is being operated automatically, for example, under control of a video editor.

SUMMARY OF THE INVENTION

A general object of this invention is to overcome these and other drawbacks of the prior art by providing a visual indication of which audio channels are currently being monitored in an audio follow video mixer. This and other objects and advantages are achieved in this invention by the use of light emitting indicators during editing operations conducted either manually or automatically.

For example, according to one embodiment of the present invention, each audio channel in an audio follow video mixer which may be selected for monitoring is provided with a LED. When any channel is being monitored, the corresponding LED automatically is lit during the monitoring. Additionally, the line out channels of an audio follow mixer are each provided with a corresponding LED. During an edit, the line out LEDs are lit simultaneously with the editing, thereby indicating that the line out channels are being monitored.

BRIEF DESCRIPTION OF THE DRAWINGS

FIG. 4 is schematic block diagram illustrating the operation of an embodiment of the present invention.

DETAILED DESCRIPTION OF THE PREFERRED EMBODIMENT

Figure 1:
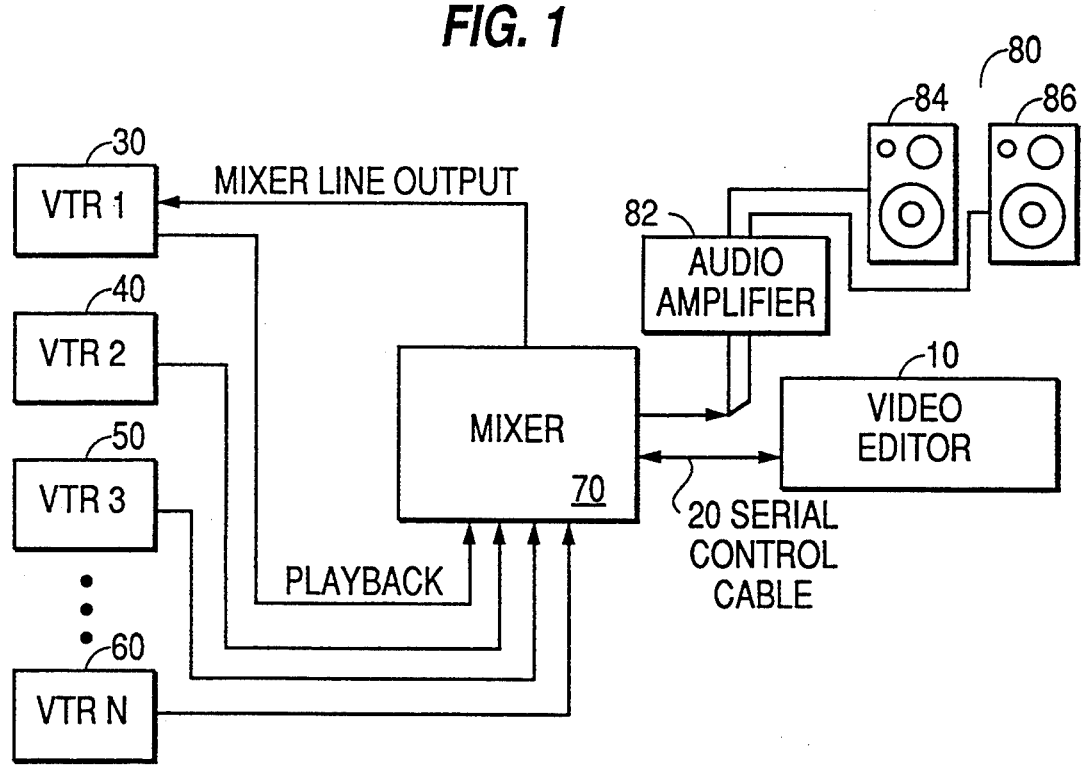
FIG. 1 is a schematic block diagram indicating a typical audio follow video mixer configuration.

Shown in FIG. 1 is a block diagram exemplifying a mixer system in which a preferred embodiment of the present invention may be incorporated. The system of FIG. 1 includes a video editor 10 connected through a control cable, preferably a serial control cable 20, to a mixer 70, which in turn is connected to an audio monitor configuration 80. The audio monitor configuration 80 may comprise, for example, an audio amplifier 82 and a plurality of audio speakers 84 and 86.

The mixer is also connected to a plurality of devices to be controlled by the editor 10, for example, a plurality of multi-channel video tape recorders (VTRs) 30, 40, 50, and 60. For convenience only, the following description will refer to VTRs, but it is to be understood that the invention is not so limited. Further, while four VTRs (VTR 1, VTR 2, VTR 3 and VTR N) are shown, additional multi-channel devices may be connected to the mixer, as indicated.

In a typical operation, the mixer 70 is used to select output channels for recording and input channels for mixing. These operations can be performed under control of the video editor 10 in a manner known in the art. For example, in FIG. 1, the VTR 30 may be designated as a recorder VTR. Further, VTRs 40 and 50 may be designated as player VTRs, that is, they provide signals selected by the mixer via the video editor to be crossfaded in the mixer. In this way, the edited signals from VTRs 40 and 50 may be provided to the recorder VTR 30.

Figure 2:
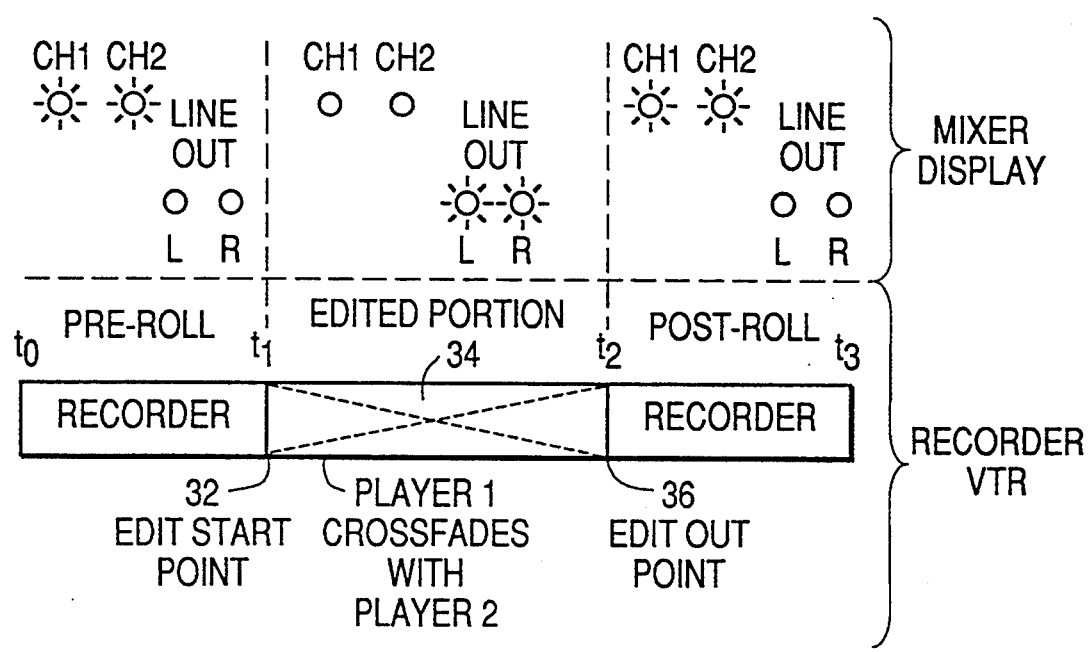
FIG. 2 is a schematic illustration of a preview operation utilizing an embodiment of the present invention.

FIG. 2 provides a more detailed illustration of an edit preview operation which may, for example, utilize a configuration such as described with reference to FIG. 1. In this example, in a tape pre-roll period between $t_0$ and $t_1$, the editor automatically selects monitoring of a recorder VTR (e.g. the VTR 30 of FIG. 1). That is, during this period, the mixer routes the channels associated with the recorder VTR 30 to monitoring devices, such as the speakers 84 and 86 of FIG. 1. In this way, the material previously recorded on the tape of a recorder VTR up to the edit start point 32 can be monitored.

In the period between $t_1$ and $t_2$, an edit takes place between the channels associated with the player VTRs (e.g. VTRs 40 and 50 of FIG. 1). This time period corresponds to an edit portion 34 of the tape of VTR 30 on which the edited signal can be recorded. The edit portion 34 terminates at the edit out point 36 which corresponds with $t_2$. In this period, the channels associated with a first player VTR crossfade with the channels associated with a second player VTR. Simultaneously with such a crossfade, the mixer routes the edit signals to the line out channels. Accordingly, the edit signals can be monitored during this time.

After the edit signals have been monitored, that is during post-roll commencing at $t_2$, the mixer returns monitor output back to VTR 30. Thus, a typical edit preview taking place under control of a video editor provides a method by which an operator may rehearse an edit prior to recording.

Figure 3:
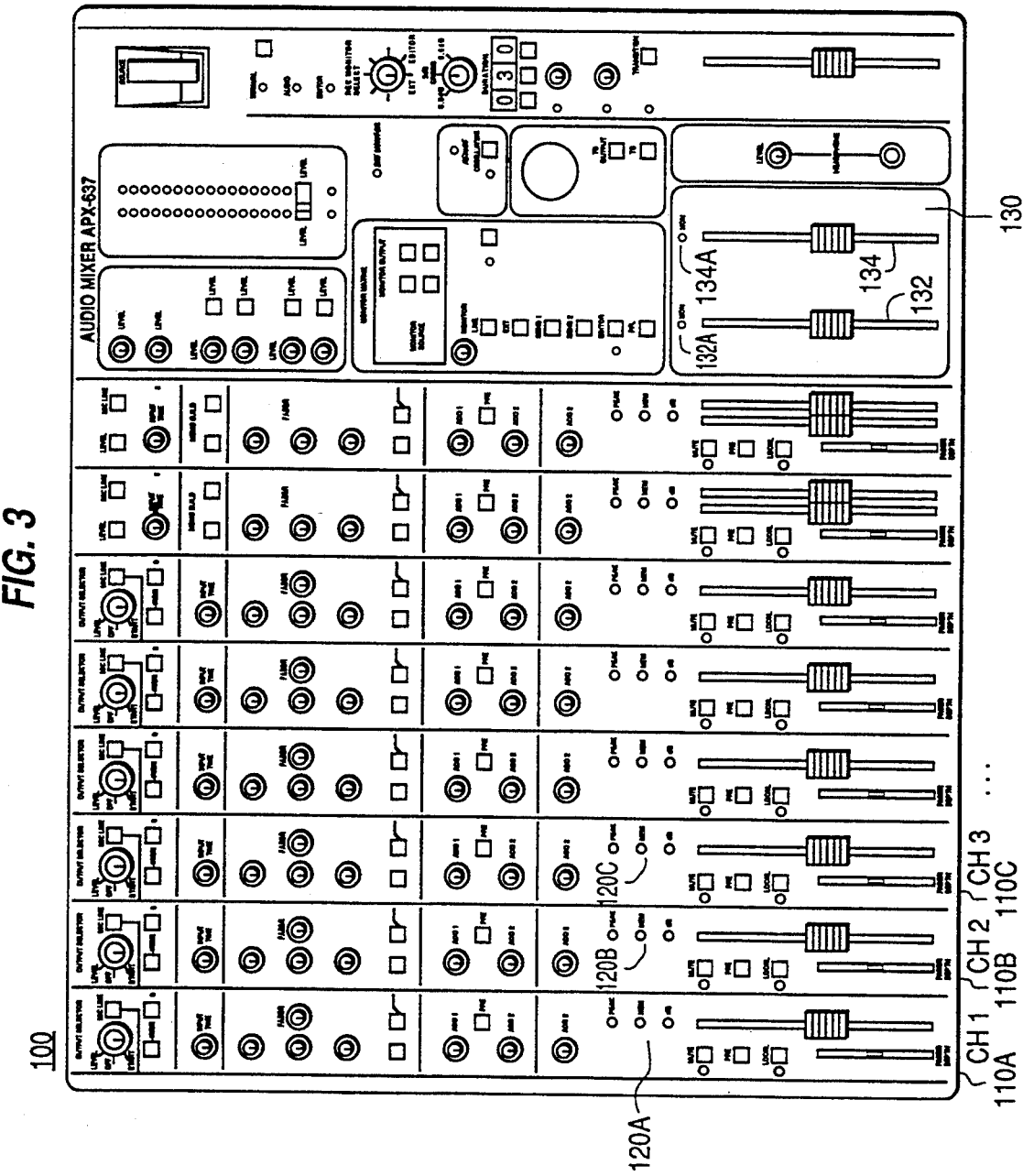
FIG. 3 is a schematic illustration of a portion of a mixer display incorporating features of the present invention.

FIGS. 2 and 3 illustrate an embodiment of the present invention which provides the operator with a clear indication of which channels are being monitored during a preview operation. As illustrated in FIG. 3, a panel display 100 of an audio follow video mixer is shown. Each channel processed by the mixer has a corresponding channel display portion 110A, 110B, 110C, and so forth. Each channel portion, for example channel portions 110A, 110B, and 110C, is further respectively provided with a corresponding monitor indicator LED, for example, 120A, 120B, and 120C.

In addition, a master fader display 130 is located on the mixer panel display 100. In the example shown, the master fader controls two channels 132 and 134 which correspond to the edited signals supplied to the line out outputs. Further, each of these channels 132 and 134 has a corresponding LED monitor indicator 132A and 134A.

According to this embodiment of the invention, whenever any channel is being monitored, the corresponding LED indicator, for example 120A, 120B, 132A or 134A, is lit. In this way, the operator is provided with a clear indication of which channels are being monitored. This indication is especially useful during an edit preview operation taking place under automatic control.

The timing of a typical application of the invention is shown in FIG. 2. The mixer display portion of FIG. 2 refers to the portions of a mixer display, such as described with reference to FIG. 3. If, for example, a recorder VTR provides a two channel input to a mixer, each channel has a corresponding channel display portion. Referring to FIG. 3, CH1 may be provided with a display portion 110A and CH2 may be provided with a display portion 110B. In the course of an edit preview operation, the monitor indicator LEDs of CH1 and CH2 (i.e., LEDs 120A and 120B) are lit during the pre-roll and post-roll periods ($t_0$-$t_1$ and $t_2$-$t_3$). However in the intervening edit period ($t_1$-$t_2$), the line out LEDs (i.e., LEDs 132A and 132B) are lit, indicating to the operator that the line out channels are being monitored. This main feature of the invention is a significant convenience to the operator.

FIG. 4 illustrates an embodiment for implementing the aforementioned features. With reference to FIG. 4, there is shown a video editor 10 which issues signals to a serial interface 150 which may include, for example, a communication port 152, microprocessor 154 and an output port 156. The serial interface 150 may be located within the mixer 70. The output of the port 156 which receives signals from the microprocessor 154 is connected to the LEDs located on the channel display portions of the mixer (110A, 110B, 110C . . . 110N) and on the master fader display 130. While four channel display portions are shown, as indicated in FIG. 4, others corresponding to other channels in the mixer are intended.

In this way, the microprocessor can control the operation of the channel display monitor LEDs (120A, 120B, 120C . . . 120N) as well as the line out monitor LEDs (132A, and 134A). For example, the microprocessor 154 may be programmed to light the appropriate monitor LED as described above when it receives control signals from the video editor 10 which initiates a preview operation, in a manner known in the art.

The invention as set forth above substantially improves the ease of operation of an audio follow video mixer system by providing a clear visual indication of which channel an operator is monitoring. It may be used most advantageously with the cross fade indicators described in commonly owned-co-pending application Ser. No. 07/866,356 in order to provide the user a complete visual indication of the status of an audio follow video mixer system.

The foregoing is a detailed description of the preferred embodiments. The scope of the invention, however, is not so limited. Various alternatives will be readily apparent to one of ordinary skill in the art. The invention is only limited by the claims appended hereto.

What is claimed is:

1. An audio follow video mixer apparatus comprising:
   a multi-channel audio mixer console;
   means for providing a plurality of audio channels to said audio mixer console;
   means located within said audio mixer console for processing said audio channels;
   a display portion of said audio mixer console separated into distinct areas corresponding to one or a pair of said audio channels;
   a line-out signal path in said audio mixer console, said line-out signal path coupling a processed audio signal determined by said processing means to an output terminal;
   a video editor operatively coupled to said mixer console to provide control signals to said processing means, said control signals determining the manner by which said audio channels are processed;
   monitor means coupled to said mixer console for monitoring a selected one of said audio channels and said processed audio signal on the basis of said control signals;
   a plurality of LEDS, each provided on said distinct areas of said display portion and being illuminated when the channel or pair of channels corresponding to the distinct area of said mixer console is monitored by said monitoring means; and
   at least one additional LED located on said display portion, said LED being illuminated when said processed audio signal is monitored by said monitoring means.

2. The apparatus of claim 1 wherein said video editor is operatively connected to said mixer console through a serial interface.

3. The apparatus of claim 1 wherein said processed audio channel is an audio signal corresponding to a crossfade from a first of said plurality of audio channels to a second of said plurality of audio channels.

4. The apparatus of claim 1 wherein said plurality of LEDs and said at least one additional LED indicate which channel is currently being monitored during a preview operation.

5. In a multi-channel mixing apparatus capable of mixing signals from at least two of a plurality of audio channels, said multi-channel mixing apparatus including an audio mixer console, a video editor for controlling the operations of the mixer console, and an aural monitoring device, a method of indicating which channels in said mixer are being monitored at any given time comprising:

providing at distinct areas of a display portion of said audio mixer console a plurality of LEDS, each corresponding to said plurality of audio channels;

providing on said display portion at least one additional LED which corresponds to a line out channel;

placing said mixer console under control by said video editor;

subsequent to said step of placing, processing said at least two channels with said video editor by performing a selected function on said two channels and outputting a resulting audio signal to said line out channel;

simultaneous with said step of processing, aurally monitoring said at least two channels and said resulting audio signal with said aural monitor device; and simultaneous with said step of aurally monitoring, visually monitoring with said plurality of LEDs and said at least one additional LED which of among said at least two channels and said resulting audio signal is being aurally monitored.

6. The method of claim 5 wherein said step of placing includes operatively connecting said video editor to said mixer console with a serial interface.

7. The method of claim 5 wherein said step of processing includes performing a crossfade from a first of said plurality of audio channels to a second of said plurality of audio channels.

8. The method of claim 5 wherein said plurality of LEDs and said at least one additional LED indicate which channel is currently being monitored during a preview operation.

* * * * *